Patented Mar. 30, 1943

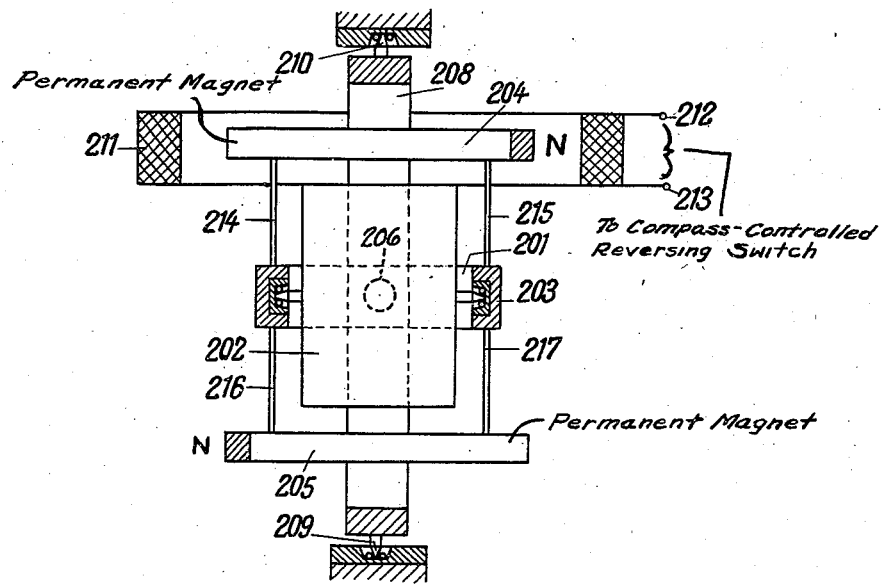

2,315,216

UNITED STATES PATENT OFFICE 2,315,216

GYROSCOPIC APPARATUS

Waldemar Möller, Rechlin, near Murow Mecklenburg, and Gert Zoege von Manteuffel, Berlin-Dahlem, Germany; vested in the Alien Property Custodian Application October 1, 1936, Serial No. 103,538
In Germany October 26, 1935

2 Claims. (Cl. 74—5)

The invention has for its purpose the improvement of gyro instruments of three degrees of freedom, equipped with a device for the generation of precession movements about a precession axis by means of a torque acting about an axis of freedom perpendicular thereto.

The purposes for which such precession movements are generated may be different according to the purpose of the instrument.

In, for instance, the case of a so-called horizon gyro, a gyro with three degrees of freedom and a vertical shaft, it is desirable to prevent departure from the vertical. For this purpose pendulous devices have been suggested that become operative when the gyro shaft departs from the vertical and generate a torque by means of air jets about a horizontal axis normal thereto which results in a precession of the gyro shaft back to the vertical. These known devices however result in a complication of a gyro instrument that is not driven by air but for instance by electricity, since in this air flow must be generated separately.

On the other hand, for electrically or pneumatically driven gyros devices have been suggested in which torque generators are attached to the corresponding axis of freedom consisting of solenoids and cores movable therein. This arrangement has the drawback that conductors through the Cardan axes are necessary, increasing their friction and complicating the manufacture.

Similar devices have been proposed for azimuth gyros, for causing these to follow the indications of a compass, which devices are usually known in the art as gyro magnetic compasses. However, here also conductors through the Cardan axes are necessary.

Finally there has been disclosed a device consisting of a ring attached to the indicator frame of an azimuth gyro and an air jet attached to the housing which prevents the drifting of the gimbal ring. The drawback of this arrangement however, is the torque exercised in one direction only operates correctly in a certain relative position of the gyro and housing, so that the use of such a device for following runs into great difficulties.

The known devices are improved by the subject of the invention and the existing drawbacks are avoided thereby, in that, in accordance with the invention, the torque causing the precession movement is exercised by a power field substantially symmetrical and/or concentric to the precession axis, and which acts on a member transmitting the torque about one axis. Considerable advantages result from the design according to the invention. On the one hand, conductors leading to the torque generator through the Cardan axes are unnecessary. On the other hand, the operation of the device, in for instance an azimuth gyro, is independent of the azimuth position of the gyro instrument. This means, that a certain precession speed always corresponds to a certain field strength for generating the torque. The field may be generated in different ways. It will often be found advantageous to drive the device for creating the precession movements from the same source as provides the power for driving the gyro, although in certain cases pneumatic-electric combinations are advantageous, for instance in the control of an electrical gyro by a pneumatic compass.

In an electro-magnetic device for generating precession movements it is preferable, to make the device such that the torque is exercised by a magnetic field generated by a coil substantially symmetrical and concentric to the precession axis, and which acts on a permanent magnet to transmit the torque about the selected axis. The advantage lies therein that a coil and a permanent magnet suffice to generate precession movements in both directions, whereby merely the flow of current in the coil has to be reversed.

If the instrument is an azimuth gyro whose azimuth position is to be controlled by precession movements, an arrangement is recommended, such that the precession movements about the vertical axis of the indicator frame are generated by a coil concentric to the indicator frame axis, which coil acts on permanent magnets attached to the gimbal ring in a plane normally parallel to the plane of the coil and having the same magnetic direction. It is recommended to make the design such that in the normal position of the gyro as determined by a magnetic compass the permanent magnets be either in the direction of the earth's magnetic field or perpendicular to the magnetic north-south direction, in order to keep the influence of the earth's magnetism on the gyro as small as possible.

The last named device may be disadvantageous if it is necessary to have the gyro instrument magnetically neutral with reference to its surroundings, for instance, not to disturb a nearby compass. Also it may be undesirable that the earth's magnetic field exercise an influence on the gyro, however small, which might cause a precession movement, especially when the coil is disconnected.

In such case, magnetic compensation is recommended such that the field generated by the permanent magnets is counteracted by a set of compensation magnets arranged at a greatly distance from the plane of the coil. Due to the different distances of the two sets of magnets, the desired influence of the field voluntarily created through the coil, remains.

If it is desired to cause precession movements in an horizon gyro, for instance for maintaining the vertical attitude of its shaft, then the device is preferably designed so that precession movements about the Cardan axes are induced by coils arranged concentric to the Cardan axes, which coils act upon permanent magnets mounted on the gimbal ring.

The invention is illustrated in the drawing, the single view of which shows an azimuth gyro with compensated magnet system, in elevation, certain parts being in section.

The gyro rotor 202 rotates about horizontal axis 201 in rotor bearing frame 203. Permanent magnet 204 is attached to the frame by straps 214, 215. Magnetic compensation means, such as permanent magnet 205, is attached to the frame by straps 216, 217. The magnets are oppositely directed, as indicated by the pole symbols, and cancel each other with respect to any surrounding or equally distributed field, such as the earth's magnetic field. The frame 203 is mounted rotatably about axis 206 in vertical ring 208. The ring is carried in bearings 209, 210. Fixed coil 211 is mounted concentric to axis 209, 210, in such manner that magnet 204 is more powerfully influenced than the more distant magnet 205. The coil has terminals 212 and 213.

The coil may be mounted at any desired elevation relative to its cooperating magnet, though for structural reasons it may be advantageous to mount both the coil 211 and the magnet 204 at some distance above the horizontal axis of the gyroscope, as shown in the drawing. Upon excitation of the coil, a torque is created about axis 206 which induces a precession about axis 209, 210. The direction of the precession is determined by the direction of the flux field created by the coil with relation to the permanent magnets, and can be changed in known manner, as by reversing the current in the coil, as from a suitable transmitter on a magnetic compass.

What is claimed is:

1. In a directional gyroscope, the combination with a rotor bearing frame, a vertical ring in which said frame is mounted for freedom about the horizontal axis, a support in which said ring is mounted for freedom about a vertical axis, an electric coil secured to said support and concentric with the axis of said vertical ring, a permanent magnet on said bearing frame normally lying in or parallel to the plane of said coil and at an angle to said first axis, means for supplying current to said coil in either direction, whereby a torque about said first named axis is exerted in either direction, dependent on the direction of flow of current through said coil, and an extra compensation permanent magnet on said bearing frame of opposite polarity to the first magnet and at a greater distance from the plane of said coil.

2. In a gyro-magnetic compass, the combination of a rotor bearing frame, a supporting casing therefor, means mounting said frame for freedom about a horizontal axis and a vertical axis within said supporting casing, electric coil means secured to said support and concentric with said vertical axis, a permanent magnet on said bearing frame normally lying parallel to the plane of said coil means and within its field and at an angle to said horizontal axis, means for supplying current to said coil means to create a flux in one direction or the other whereby a torque about said horizontal axis is exerted in either direction dependent on the direction of said flux, and magnetic compensation means adapted to set up a field equal and opposite to the field of said permanent magnet relative to the earth's magnetic field.

WALDEMAR MÖLLER.
GERT ZOEGE von MANTEUFFEL.